United States Patent [19]
Kilpatrick et al.

[11] Patent Number: 5,875,465
[45] Date of Patent: Feb. 23, 1999

[54] CACHE CONTROL CIRCUIT HAVING A PSEUDO RANDOM ADDRESS GENERATOR

[75] Inventors: Michael Thomas Kilpatrick; Simon Charles Watt; Guy Larri, all of Cambridge, United Kingdom

[73] Assignee: Arm Limited, Cambridge, United Kingdom

[21] Appl. No.: 832,091

[22] Filed: Apr. 3, 1997

[30] Foreign Application Priority Data

Apr. 3, 1996 [GB] United Kingdom .................. 9607044

[51] Int. Cl.$^6$ ....................................................... G06F 12/08
[52] U.S. Cl. .......................... 711/134; 711/123; 711/128; 711/129; 711/145; 364/717.03
[58] Field of Search ................................. 711/133, 134, 711/123, 128, 129, 145, 163, 171, 173; 365/717.01, 717.03

[56] References Cited

U.S. PATENT DOCUMENTS

5,434,992  7/1995  Mattson .................................. 711/119

FOREIGN PATENT DOCUMENTS

| 0 075 714 | 4/1983 | European Pat. Off. . |
|---|---|---|
| 0 442 474 | 8/1991 | European Pat. Off. . |
| 0 466 265 | 1/1992 | European Pat. Off. . |
| 0 481 616 | 4/1992 | European Pat. Off. . |
| 2 214 336 | 8/1989 | United Kingdom . |
| 2 250 114 | 5/1992 | United Kingdom . |
| 2 292 822 | 3/1996 | United Kingdom . |

*Primary Examiner*—Eddie P. Chan
*Assistant Examiner*—Hiep T. Nguyen
*Attorney, Agent, or Firm*—Nixon & Vanderhye P.C.

[57] ABSTRACT

A data processing system incorporating a cache memory 2 and a central processing unit. A storage control circuit 10 is responsive to a programmable partition setting PartVal to partition the cache memory between instruction words and data words in dependence upon whether the central processing unit 4 indicates with signal I/D whether the word to be stored within the cache memory 2 resulted from an instruction word cache miss or data word cache miss. The cache memory array 2 may have a programmably sized portion locked down so that it is not replaced. The selection within the complementary programmable range where overwriting takes place uses a pseudo random selection technique using pseudo random number generator in the form of a linear feedback shift register triggering incrementing of a counter.

21 Claims, 10 Drawing Sheets

CACHE CONTROL CIRCUIT HAVING A PSEUDO RANDOM ADDRESS GENERATOR

BACKGROUND OF THE INVENTION

1. Field of the Invention

This invention relates to the field of data processing. More particularly, this invention relates to data processing systems incorporating a cache memory.

2. Description of the Prior Art

It is known to provide data processing systems incorporating a cache memory for the purpose of increasing the speed of operation of the system by providing high speed access to a subset of the data and instructions words required by the system. Whilst cache memory offers high speed it is of a limited capacity and so careful selection and management of the information stored within the cache memory is required in order to gain the best from the system.

A part of proper cache control is the selection of which data should be held within the cache. It is known to provide cache control systems operating with various different replacement algorithms used to select a cache storage location to be overwritten with a new word when it is desired to place that new word into the cache following a cache miss. Examples of such selection techniques include least recently used, cyclic (i.e. sequential or "round robin"), or random. It is also known to provide cache memory systems in which some data words are locked in place within the cache and are not normally overwritten following a cache miss.

SUMMARY OF THE INVENTION

Viewed from one aspect this invention provides apparatus for data processing comprising:

a cache memory having X cache storage locations each storing a data line including one or more data words;

a storage control circuit for controlling storage of a new line within said cache memory following a cache miss including selection of a cache storage location to be overwritten when said new line is stored in said cache memory;

wherein said storage control circuit includes a pseudo random number generator comprising a counter triggered to change a stored value by counting through one or more values in response to a pseudo random bit stream output from a pseudo random bit stream generator and said storage control circuit pseudo randomly selects said cache storage location using said stored value from a programmable range of cache storage locations A to B within said X cache storage locations of said cache memory, cache storage locations outside of said programmable range being unavailable to be overwritten, A and B being stored within respective end point registers and used as wrap values for said counter.

The invention provides a system having a combination of features that has been found to be particularly advantageous for producing high speed and flexible cache operation over a wide variety of applications. More particularly, the invention provides a system providing a combination of a programmable range within which overwriting is to occur (and accordingly a complementary range that is locked down) and within that range uses a pseudo random selection of which storage location is to be overwritten. The above is provided using an efficient pseudo random number generation mechanism with a fine grained control of the lockdown region.

Pseudo-random selection of the storage location to be overwritten is surprisingly effective and desirable since it provides a high degree of resistance to certain "pathological" conditions that can arise in other systems. These "pathological" conditions with other selection techniques occur when an unfortunate mis-match occurs between the program being executed by the system and the configuration of the cache whereby a high degree of swapping of data into and out of the cache occurs because of an accidental regularity and periodicity in the location of the data words and the way they are accessed. A pseudo-random replacement technique might be thought to be sub-optimal in terms of the absolute performance that can be achieved, but in fact turns out to be highly desirable since its performance is very consistent over a range of programs being operated and data items being operated upon. Consistent performance is desirable in general purpose computers that will run a wide range of applications.

In preferred embodiments of the invention said storage control circuit is responsive to a programmable replacement algorithm flag to select said cache storage location with an alternative algorithm.

The performance of the system may be improved by allowing a different selection technique to be temporarily selected through use of programmable replacement algorithm flag in circumstances where it is known that this will be appropriate. For example, should a cache memory test or real time system where predictability is very desirable be required then it is most appropriate to use a sequential (round robin) replacement technique. Thus, a single device may be made with cache replacement to serve different markets being supported.

In preferred embodiments of the invention said pseudo random bit stream generator is a linear feedback shift register.

A pseudo-random number generator taking the form of a counter that is incremented or decremented (or added to or subtracted from) in response to the bits within a pseudo-random bit stream output from a linear feedback shift register has been found to be a highly efficient and effective way of implementing a pseudo random replacement technique.

The pseudo random number generator could be intermittently operated, however in preferred embodiment said pseudo random number generator is continuously operated and said stored value used to select said cache storage location to be overwritten when need by said storage control circuit.

Continuously operating the pseudo random number generator and then using the contents of the counter as and when required (i.e. usually at irregular intervals) adds an additional degree of randomness to the system that is desirable. Furthermore, in circumstances where the counter value is sample very frequently, the variation tends towards a regularly increment or decrement, which may be appropriate in the case of a cache flush requiring a large amount of data within the cache to be swapped at one time.

The random number generator is particularly well suited for producing a random number sequence within an arbitrarily defined range of numbers by virtue of the provision of programmable wrap values for the counter. It is normally difficult to produce a random number sequence within an arbitrary range without using larger and more sophisticated circuitry that is less efficient and more expensive.

In order to guard against the overwriting of a data value that has just been placed into the cache memory, in preferred embodiments of the invention said counter value is change by a value of one independently of said linear feedback shift register each time a cache storage location is overwritten.

Whilst the normal mode of operation of the system is with the pseudo random selection within a sub-set of the cache storage locations, in order to be able to place the essentially permanent data within the cache memory it is desirable to provide a lockdown write mode in which those storage locations to be locked down may be loaded.

This feature is further enhanced in embodiments in which individual locations may be addressed using a programmable lockdown address location register.

In preferred embodiments of the invention, said cache miss results from a cache request to said new word from one of a plurality of request sources and said storage control circuit is responsive to a programmable partition setting to divide said cache memory into a plurality of portions each with a storage capacity controlled by said programmable partition setting and said storage control circuit selects in which of said plurality of portions to store said new word in dependence upon which of said plurality of request sources requested said new word.

This feature provides a cache memory that may be programmably partitioned between words requested by different request sources. For example, the prefetch unit within a central processing unit may act as one request source for instruction words and the load store unit within a central processing unit may act as another request source for data words. The cache requests may be read requests in a read allocate cache, write requests in a write allocate cache or more generally, any request type that causes a cache entry replacement for that cache implementation. The division of the available cache memory capacity between instruction words and data words is not fixed by the manufacture of the system and so can be varied to suit the particular task being performed. Compared with the analysis required to effectively use lock down, the determination of the best programmable partition setting is relatively straightforward since the software may simply be run at different settings and the overall performance observed without having to understand or track in detail which words were and were not cached at a particular time. Furthermore, the programmable partition setting may be changed (or switched off completely allowing a unified cache mode) during operation giving an additional degree of sophistication if required. For example, should a program be entering a portion of digital signal processing that is highly data intensive but relatively instruction unintensive, then the partition between data and instruction cache storage can be moved to allow more data cache storage.

It would be possible to design a system such that the cache requests were directed only to the appropriate portion of the cache memory depending upon the request source. However, in preferred embodiments of the invention said cache request searches all of said portions for said new word.

This feature allows the partitioning of the cache to be changed whilst operation is occurring knowing that cached data that is now in the "wrong" portion due to the change will still be found and written back to main memory when replaced so avoiding consistency problems. It has been found that the invention may be effectively implemented by modifying the replacement mechanisms such that data is only ever written into its allocated portion but that the advantages of only searching for data within the appropriate allocated portion and flushing data (a very time consuming operation when many slow external memory accesses have to be made, particularly for a write back cache) when there is a change in partition are outweighed by the complexity and cost of adapting the system to achieve this. Furthermore, this simple implementation copes with in-line data (without having to store two copies) and self modifying code.

As discussed above, the invention may be particularly useful in embodiments in which the request sources include a data request source and an instruction request source within a central processing unit, which often share an access port. Other examples of systems in which the invention is particularly useful would be those in which a cache memory is partitioned between words required by a central processing unit and words required by a coprocessor or partitioned between different program tasks in a multi-tasking system.

Another preferred feature of the invention is that said storage control circuit selects which currently stored word within said selected portion of said cache memory to overwrite with said new word using independent algorithms for each of said plurality of portions.

Viewed from another aspect the present invention provides a method of processing data, said method comprising the steps of:

storing data lines comprising one or more data words in a cache memory having X cache storage locations; and controlling, with a storage control circuit, storage of a new line within said cache memory following a cache miss including selection of a cache storage location to be overwritten when said new line is stored in said cache memory;

wherein said storage control circuit includes a pseudo random number generator comprising a counter triggered to change a stored value by counting through one or more values in response to a pseudo random bit stream output from a pseudo random bit stream generator and said storage control circuit pseudo randomly selects said cache storage location using said stored value from a programmable range of cache storage locations A to B within said X cache storage locations of said cache memory, cache storage locations outside of said programmable range being unavailable to be overwritten, A and B being stored within respective end point registers and used as wrap values for said counter.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
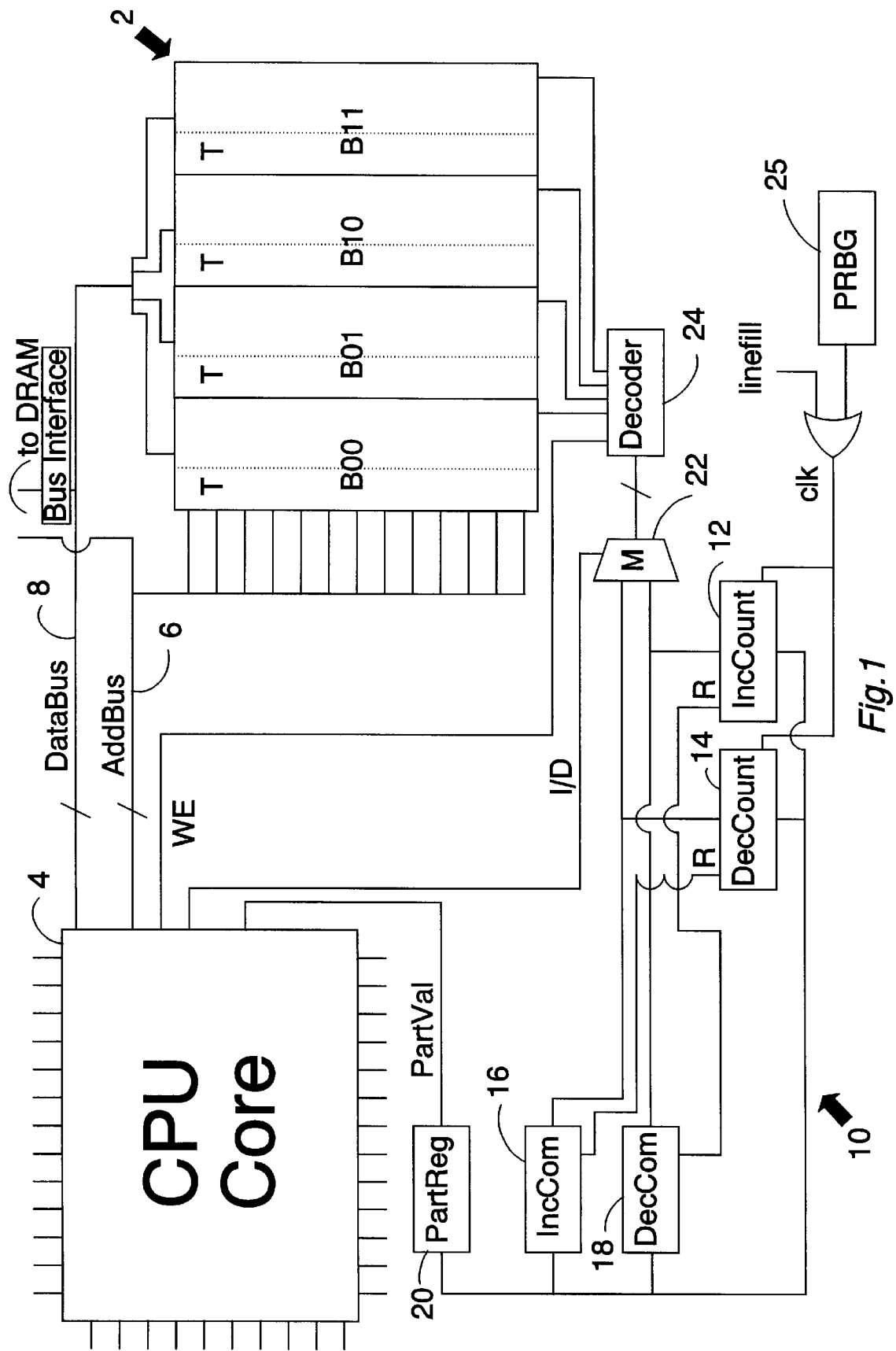
FIG. 1 illustrates a data processing system incorporating a cache memory with a programmable partition between request sources.

FIG. 1 illustrates a system incorporating a cache memory 2 operating in conjunction with a central processing unit 4. The cache memory 2 is composed of four banks of memory (B00, B01, B10 and B11) each with an associated TAG portion T. The cache memory 2 is configured as a 4-way associative (TAG based) cache memory with one word per line and using a random replacement algorithm. It will be understood that each cache line could comprise more than one word, with each line being replaced or loaded as a whole. An address bus 6 and a data bus 8 connect the central processing unit 4 and the cache memory 2. Data being written to or read from the cache memory 2 is asserted on the data bus 8 with the address with which it is associated being asserted on address bus 6 such that the correct row within the cache memory 4 can be identified and the TAG for the word written or compared, as appropriate. A storage control circuit 10 is provided that comprises an incrementing counter 12, a decrementing counter 14, an incrementing counter comparator 16, a decrementing counter comparator 18, a partition setting register 20, a multiplexer 22 and a decoder 24. A clock signal clk is supplied to both the incrementing counter 12 and the decrementing counter 14 to trigger incrementing and decrementing respectively within a range of values defined by the programmable partition setting PartVal stored within the partition setting register 20. The clock signal clk is derived from a pseudo random bit stream generator 25 (ORed with a linefill signal to ensure a change upon a write) that triggers the decrementing counter 14 and the incrementing counter 12 such that they effectively change randomly. This randomness provides resistance to pathological replacement conditions arising in use. When the counters 12, 14 are sampled to determine the bank within which a new word should be written, the value read out appears essentially random within the range within which it varies.

The incrementing counter 12 increments in value with each pulse of the clock signal clk. This value is then supplied to the incrementing counter comparator 16 where it is tested to see if it has reached the maximum value of 11. When this condition is met incrementing counter is reset by a signal R to load the value PartVal stored in the partition setting register 20 plus 1. The decrementing counter 14 operates in a similar manner except that with each clock signal pulse clk, its count decrements and when the decrementing counter comparator 18 determines its value is 00, then the decrementing counter is reset by a signal R to load the value PartVal stored in the partition setting register.

A multiplexer 22 selects one of the contents of the incrementing counter 12 and the decrementing counter 14 and supplies it to a decoder 24. The multiplexer 22 is switched by a signal I/D from the central processing unit 4 that indicates the request source that is triggering the new line to be written into the cache memory 2. If the I/D signal indicates that the prefetch unit within the central processing unit core 4 was the source of the cache miss, then the I/D value is set to I and the incrementing counter value is selected by the multiplexer 22 and decoded by the decoder 24. Conversely, if the I/D signal indicates that the load store unit was the source of the cache miss for the new word that is now being stored within the cache memory 2, then the I/D signal is set to D, the multiplexer 22 selects the contents of the decrementing counter 12 to be passed to the decoder 24.

The programmable partition setting PartVal is loaded into the programmable setting register 20 from the central processing unit 4 as a register load under program control. At the start of a particular software program to be executed, or indeed within that program, then the programmable setting register 20 may be loaded with the desired value. In a system with a coprocessor, the partition value register 20 may be a coprocessor register that is loaded from a central processing unit register using a move coprocessor register instruction.

In the case of a linefetch following a cache miss, as distinct from a processor write to the cache memory 2, a write enable signal WE issued from the central processing unit 4 to the decoder 24 serves to only enable writes to the cache memory 2 via the appropriate write enable line to an individual bank. In this case a linefetch following a cache miss to a cacheable area of memory may be caused by a processor read access. Processor writes are written directly into the cache memory 2 by a different mechanism.

Figure 2:
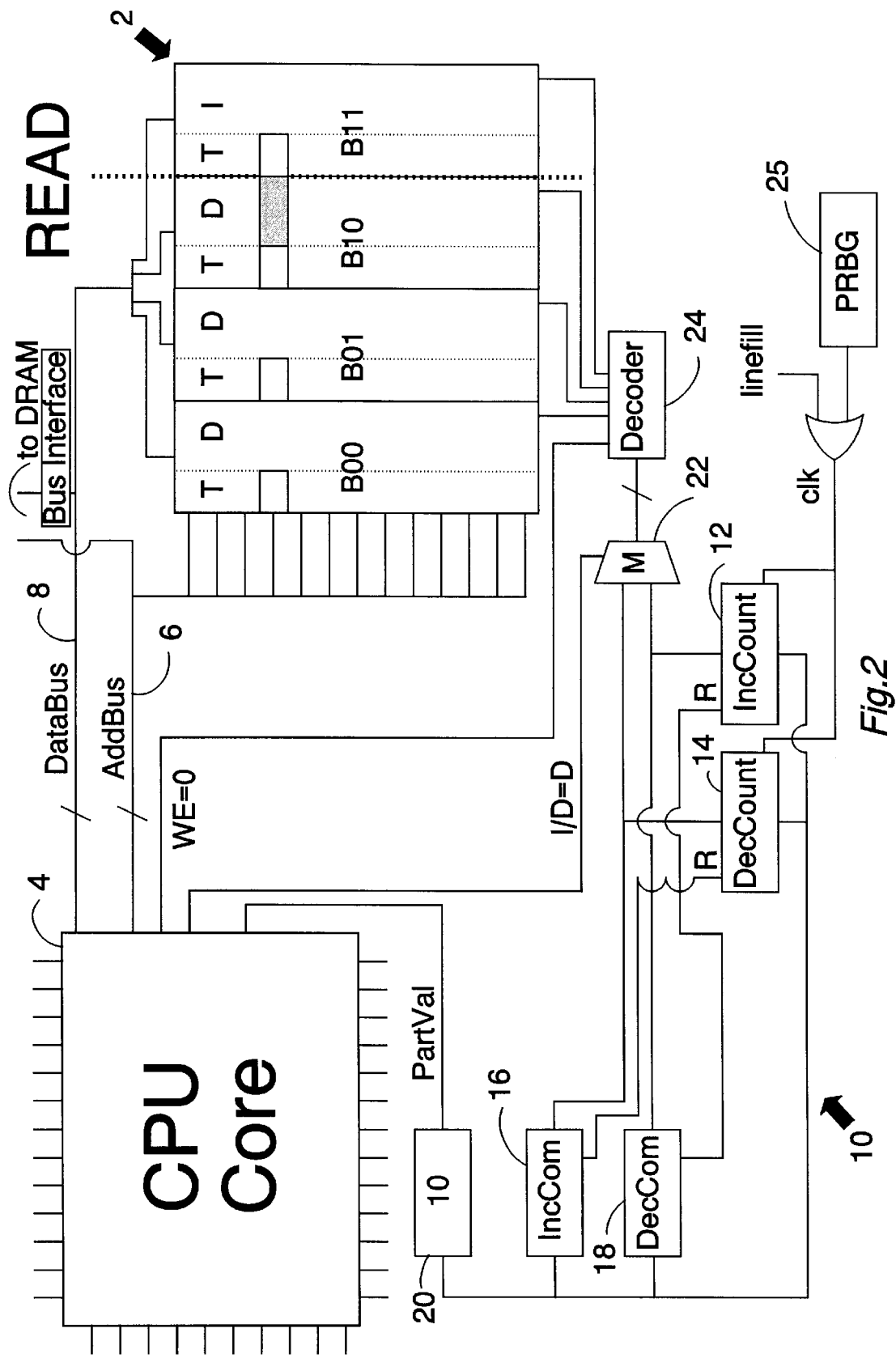
FIG. 2 illustrates the operation of the system of FIG. 1 when reading a word from the cache.

FIG. 2 illustrates the operation of the system of FIG. 1 to read a word from the cache memory 2. The write enable signal WE is disabled. In this case, the word to be read is a data word and so that I/D signal is set to D. The cache memory 2 in this case is partitioned to hold a single bank of instruction words I and three banks of data words D. The cache request is passed to all portions of the cache memory 2 such that the TAGs for each of the banks of a given row is compared with the higher order bits of the address on the address bus 6 to determine whether any of the cache locations is storing the required word. In this case, bank B10 is storing the word resulting in a TAG match and the required data word being asserted upon the data bus 8 and return to the central processing unit 4. This embodiment is a TAG based primary cache, although the technique is equally applicable to CAM based caches, secondary caches, tertiary caches and other applications of cache memories.

Figure 3:
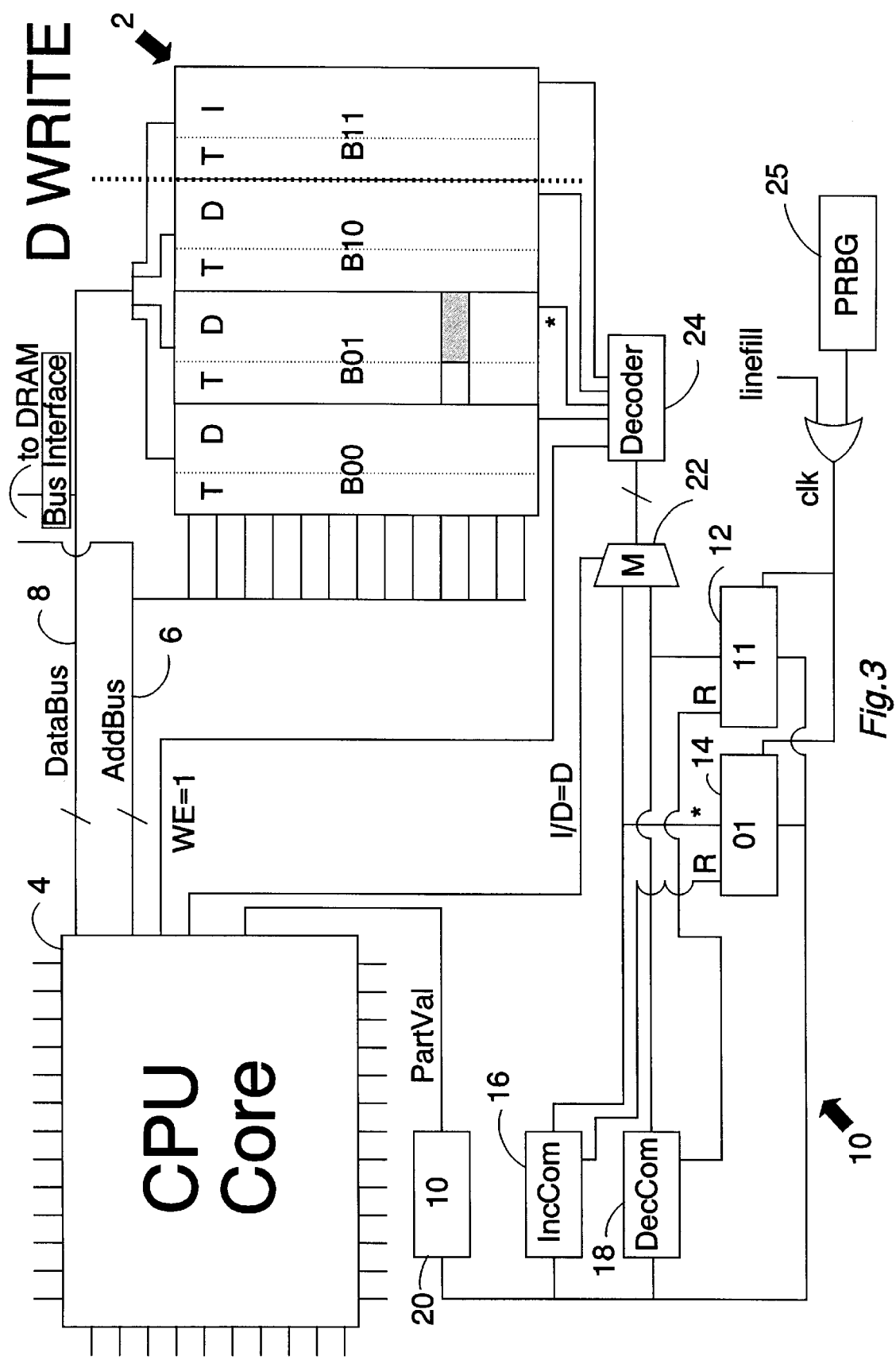
FIG. 3 illustrates the operation of the system of FIG. 1 when writing a data word to the cache.

FIG. 3 illustrates the operation of the system of FIG. 1 when writing a data word to the cache memory 2. The writing of this data word to the cache memory 2 is subsequent to a cache miss from a load register instruction resulting in the data word having to be fetched from the external memory. As the data word is asserted upon the data bus 8 and its address asserted upon the address bus 6, the write enable signal WE is asserted. The I/D signal indicates that a data word D is being written and so the multiplexer 22 selects the current output of the decrementing counter 14 (as indicated by a *) and supplies this to the decoder 24. The current output of the decrementing counter 14 is 01 indicating that bank B01 should be used to store the new data word. The programmable partition setting previously loaded into the programmable setting register 20 is 10 indicating that the first three banks of the cache memory 2 should be used for data and only the top bank should be used for instructions. The content of the decrementing counter 14 thus follows the sequence 10, 01, 00, 10, . . . whilst the incrementing counter 12 provides a constant output of 11. The decoder 24 serves to decode the two bit value fed to it from the decrementing counter 14 to write enable a single one of the banks of the cache memory 2 via the bank enable line indicated by a *.

Figure 4:
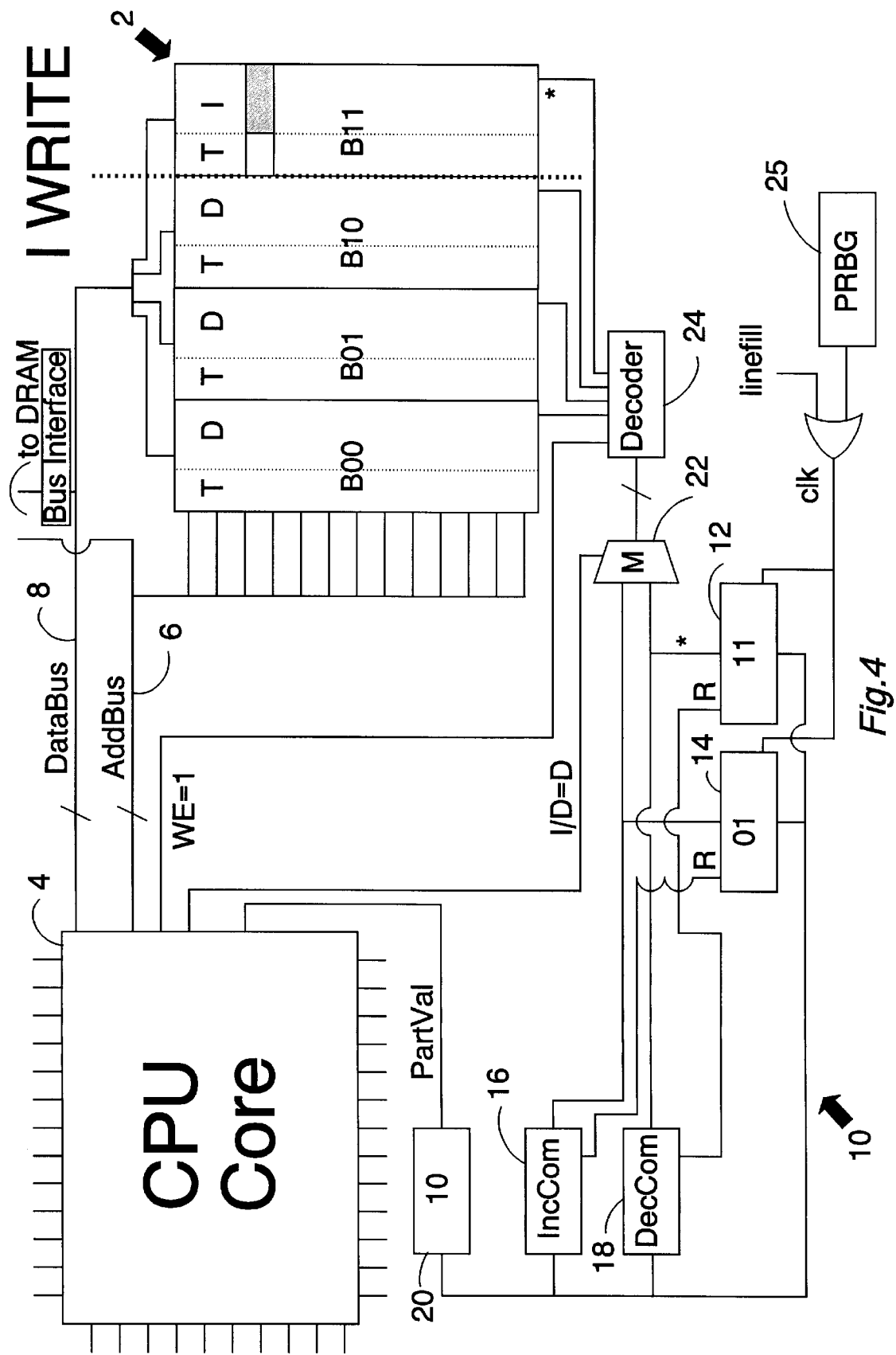
FIG. 4 illustrates the operation of the system of FIG. 1 when writing an instruction word to the cache.

FIG. 4 illustrates the operation of the system of FIG. 1 when storing an instruction word in the cache memory 2 following a cache miss. This operation is similar to that illustrated in FIG. 3 except that the I/D signal now indicates an instruction word I so causing the multiplexer 22 to select the output of the incrementing counter 12 to be decoded by the decoder 24. Given the setting of the programmable partition setting, the single instruction bank B11 is write enabled for the storage of the new write word.

Figure 5:
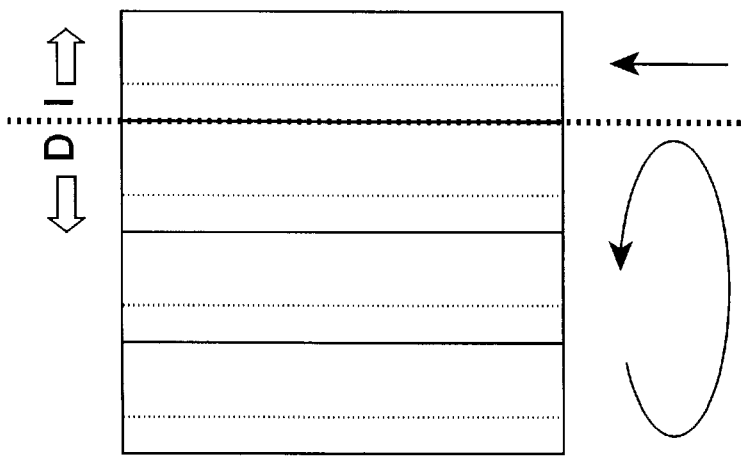
FIG. 5 illustrates a first partition of the cache of FIG. 1.

FIG. 5 schematically illustrates the partition of the cache memory 2 of the system of FIG. 1 and the manner in which the replacement bank selection is varied. In this case, a single bank is always selected for instruction words and one of the three possible banks is selected for data words. The decrementing counter 14 is responsible for which of the banks is selected for a data word. Since writes to the cache occur in no fixed relationship to the pseudo clocking of the decrementing counter 14 and the incrementing counter 12, the sampling of this counter produces an effectively random selection of one of the three banks for the data word. Since with this setting of the programmable partition setting, only a single bank is available for instruction words, this bank is continuously selected for instruction word writes. It might be thought that infrequent sampling of a continuously steadily incrementing counter might provide an effectively pseudo random output, but this is not the case as a pathological fixed relationship between repeated instructions within a program and the counter can still arise.

Figure 6:
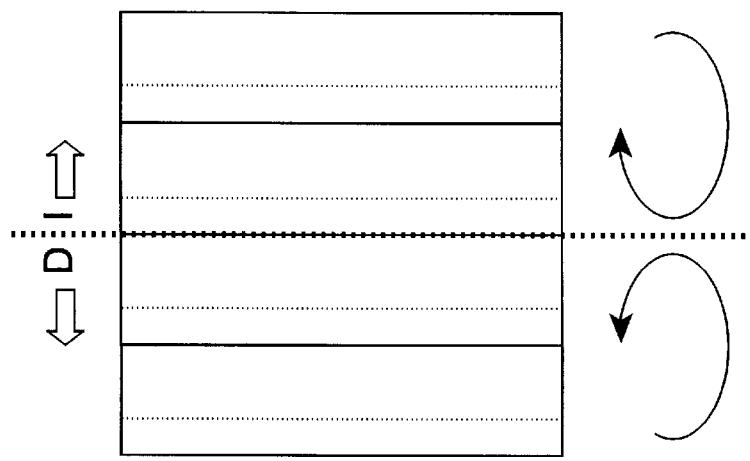
FIG. 6 illustrates a second partition of the cache of FIG. 1.

FIG. 6 illustrates the arrangement when two banks each of the cache memory 2 are allocated for data words and instructions words.

Figure 7:
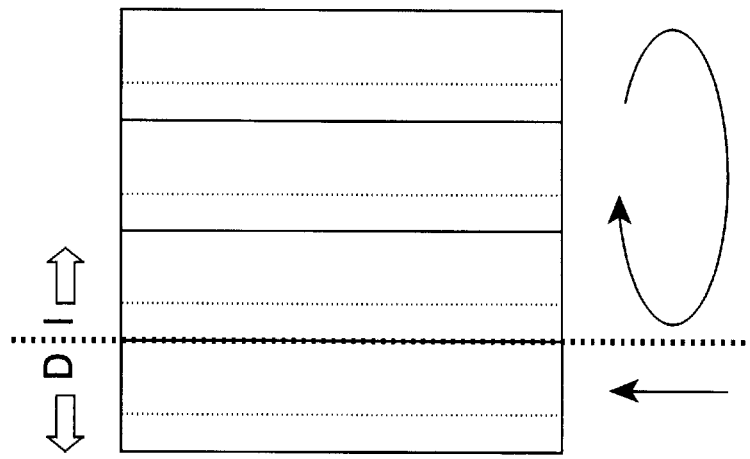
FIG. 7 illustrates a third partition of the cache of FIG. 1.

FIG. 7 illustrates the situation in which three banks are allocated for instruction words and a single bank is allocated for data words.

Figure 8:
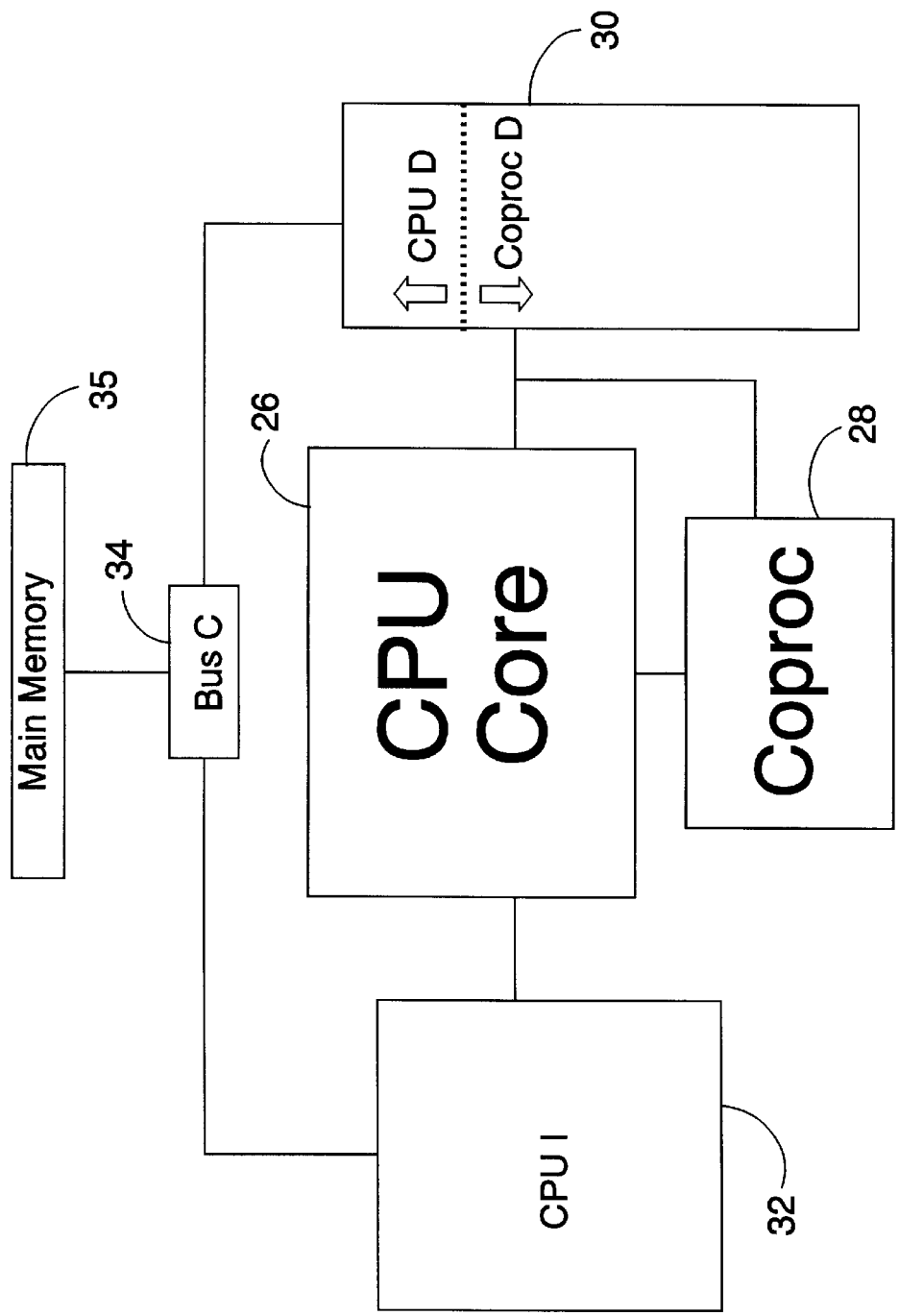
FIG. 8 illustrates a system incorporating a central processing unit and coprocessor with a cache partitioned between these two sources.

FIG. 8 illustrates a second embodiment of the invention. In this case the system comprises a central processing unit 26 and a coprocessor 28. The system has a data cache 30 and a separate instruction cache 32. The coprocessor 28 is passed instructions by the central processing unit 26 and so does not require any direct access to the instruction cache 32. However, the coprocessor 28 and the central processing unit 26 both have direct access to the data cache 30. According to this embodiment, the data cache 30 is partitioned between central processing unit data requested by the central processing unit 26 and coprocessor data requested by the coprocessor 28. The programmable partition setting illustrated shows a large proportion of the storage capacity of the data cache 30 is allocated to coprocessor data. A bus controller 34 controls the routing of words to and from the main memory 35 and the data cache 30 and the instruction cache 32.

Figure 9:
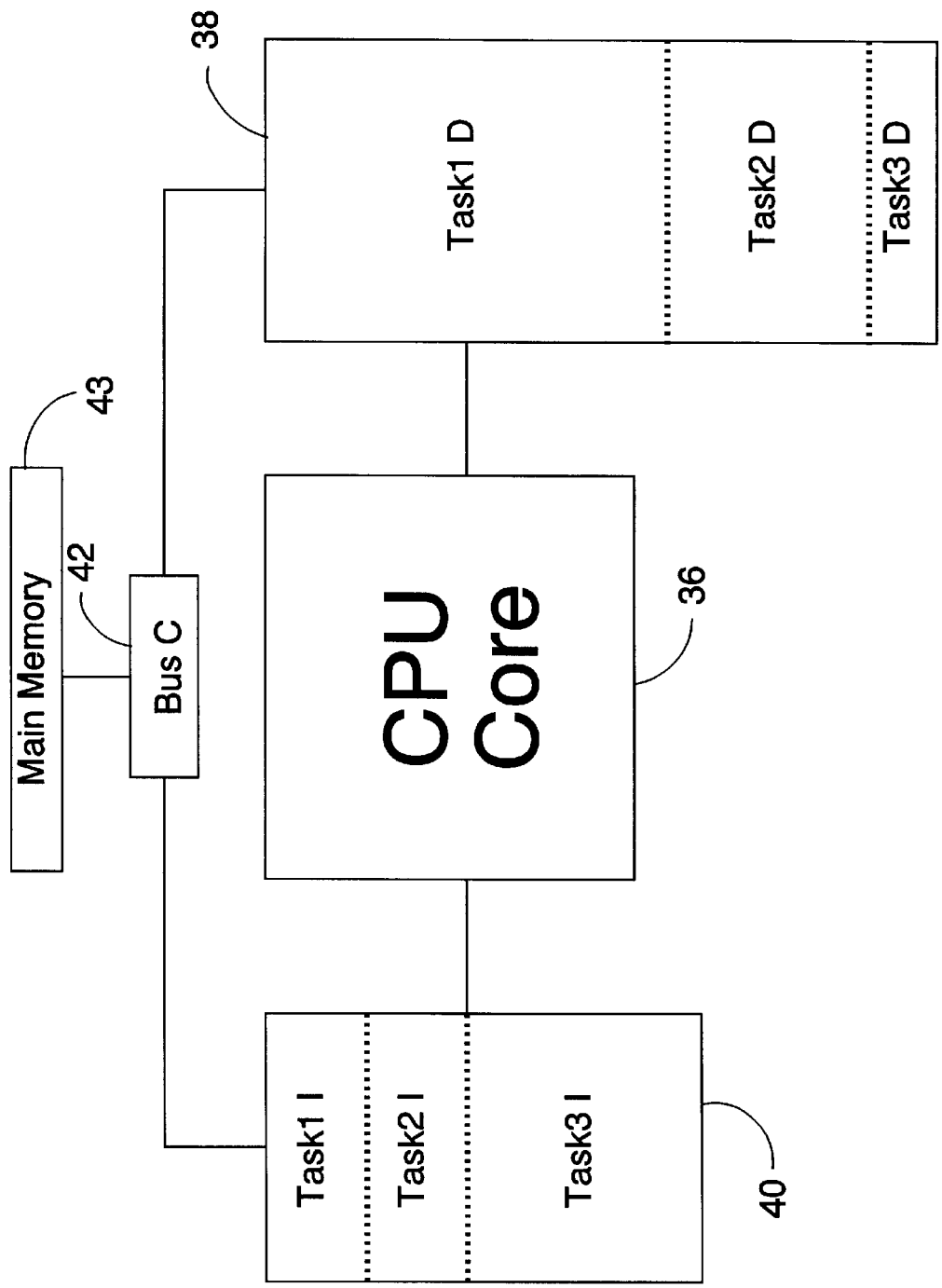
FIG. 9 illustrates a system incorporating a central processing unit operating in a multi-tasking mode with an instruction cache partitioned between tasks and a data cache partitioned between tasks.

FIG. 9 illustrates a further embodiment of the invention. In this case, a central processing unit 36 is provided with a data cache 38 and an instruction cache 40. The central processing unit 36 is operating in a multi-tasking role using three quasi-independent tasks Task1, Task2 and Task3. The data cache 38 is partitioned into portions each corresponding to a respective one of the tasks being performed by the central processing unit 36. The instruction cache 40 is similarly partitioned between instructions corresponding to the various tasks. The relative proportions of the available capacity allocated to each task need not be the same between the instruction words and the data words for that task. A bus controller 42 controls the routing of data to and from the main memory 43 and the data cache 38 and the instruction cache 40.

Figure 10:
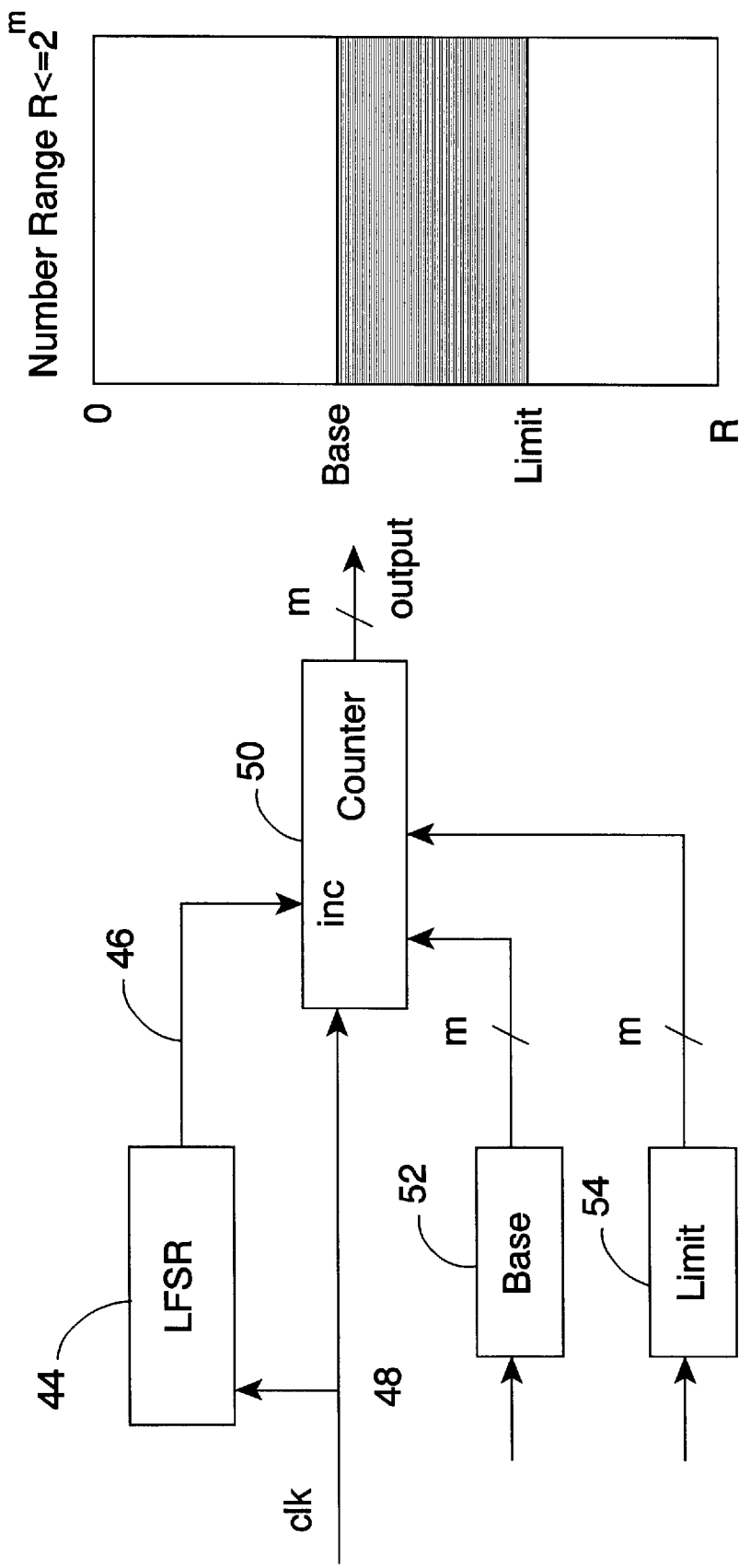
FIG. 10 illustrates a pseudo random number generating circuit.

FIG. 10 illustrates a pseudo random number generator. The circuit of FIG. 10 provides a way of generating pseudo random numbers within a controlled range between a base value and a limit value. A linear feedback shift register 44 generates a pseudo random bit stream on signal line 46. The linear feedback shift register 44 is clocked by each clock cycle by the signal on line 48. The bit value (0 or 1) present on line 46 at that time controls whether a counter 50 increments in that clock cycle. The counter 50 is supplied with end point values from a base register 52 and a limit register 54. These end point values control the maximum value reached by the counter (i.e. the limit value) before it is reset back to the bottom point of its range (i.e. the base value). In this way, the counter 50 will be pseudo randomly incremented with each clock cycle to execute a count between a base value and a limit value before returning to the base value. If the output of the counter 50 is sampled at infrequent intervals relative to the clocking and incrementing, then it will appear to generate a good approximation to a random number.

The limit value can be set to any value greater than the base value and so avoid the limitation to caches having an associativity that must be a power of 2.

If the output from the counter is sampled more frequently such that it is sampled at a frequency comparable with the clock frequency, then the output will tend towards a non-random sequential increasing count. This behaviour may be advantageous in the context of a cache memory since a frequent reference to the output of the counter to select a word for overwriting will tend to correspond to a cache flushing situation in which it would not be desirable to randomly pick locations for overwriting since this could overwrite data words that have only just been stored into the cache.

It is possible that the linear feedback shift register 44 could be used to produce a sequence of multi-bit numbers which were added to the value within the counter 50 rather than relying on the occurrence or non-occurrence of an increment event with each clock cycle. Furthermore, it is possible that the counter 50 could operate in other than a purely incrementing fashion, e.g. in accordance with a Gray coded sequence.

Figure 11:
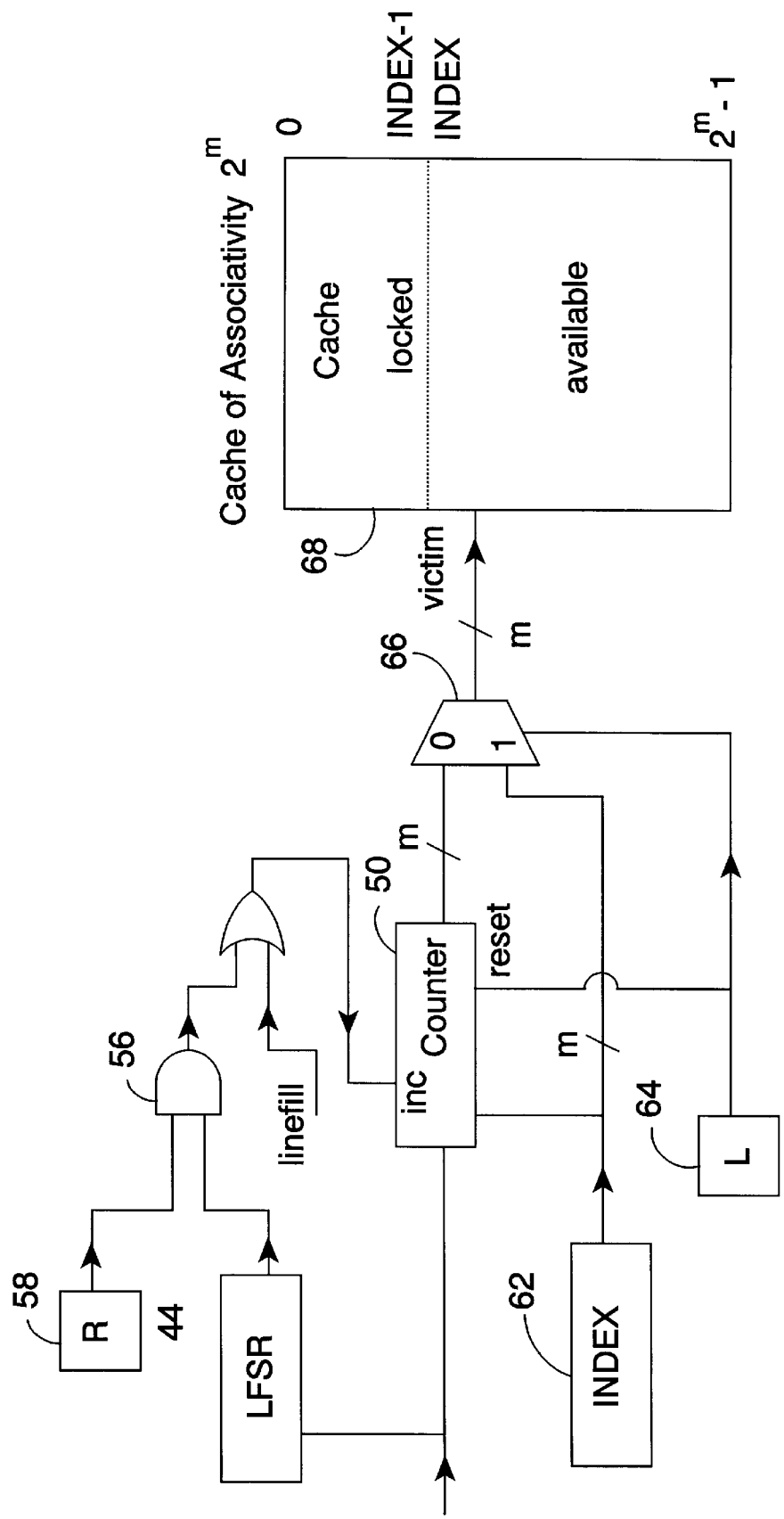
FIG. 11 illustrates a cache memory operating with a programmable lockdown portion and a pseudo random replacement technique.

FIG. 11 illustrates a cache memory system utilising a pseudo random number generator as described with reference to FIG. 10. A pseudo random bit stream from a linear feedback shift register 44 is supplied via an AND gate 56 whose other input is a replacement algorithm flag bit R from an algorithm selection register 58. The replacement algorithm flag bit R controls whether pseudo random replacement or round robin replacement is used. If R is 1, then the output from the linear feedback shift register 44 is passed by the AND gate 56 to an OR gate 60 before being applied to a counter 50. The other input to the OR gate 60 is a linefill signal that is asserted each time a cache storage location is overwritten and thereby ensures that the counter 50 is incremented each time a write occurs so that a cache location that has just been overwritten will not be overwritten again as the immediately following event.

In the embodiment of FIG. 11, the pseudo random replacement takes place in a range extending from a lower address limit given by an index value stored in an index register 62 and extending up to the top of the cache. In the case of a cache having an associativity of $2^m$, the counter will cycle from a value given by INDEX, as stored in the index register 62, to a value $2^{m-1}$.

The storage control circuit illustrated in FIG. 11 is operable in a lockdown write mode by the setting of a flag L stored within a lockdown register 64. Resetting of the flag L also resets the counter 50 to load the INDEX value and so avoid leaving the counter 50 pointing to a cache location inside the locked down region. This flag L serves to switch a multiplexer 66 that supplies the number of the victim cache storage location within the cache memory 68 that is to be written. When the flag L is set, the value stored within the index register 62 is supplied as the victim number rather than the value from the counter 50. The index register 62 is accessible under program control and so a specific victim number may be written in this index register 62 before the data that it is desired to place into that location is read from the external memory. Accordingly, when a cache miss occurs on that external memory read, then the data will be written into the cache memory 68 at the programmably specified victim location. When loading of data into the region to be locked-down is complete, the INDEX register is written to set the size of the lockdown region, and then the flag L is set to 0. Flag L also controls the reset input of the counter so that when L is changed from 1 to 0 the counter is loaded from the INDEX register. This ensures that the counter is outside the locked region and that no data in the locked region will be accidentally over-written.

Figure 12:
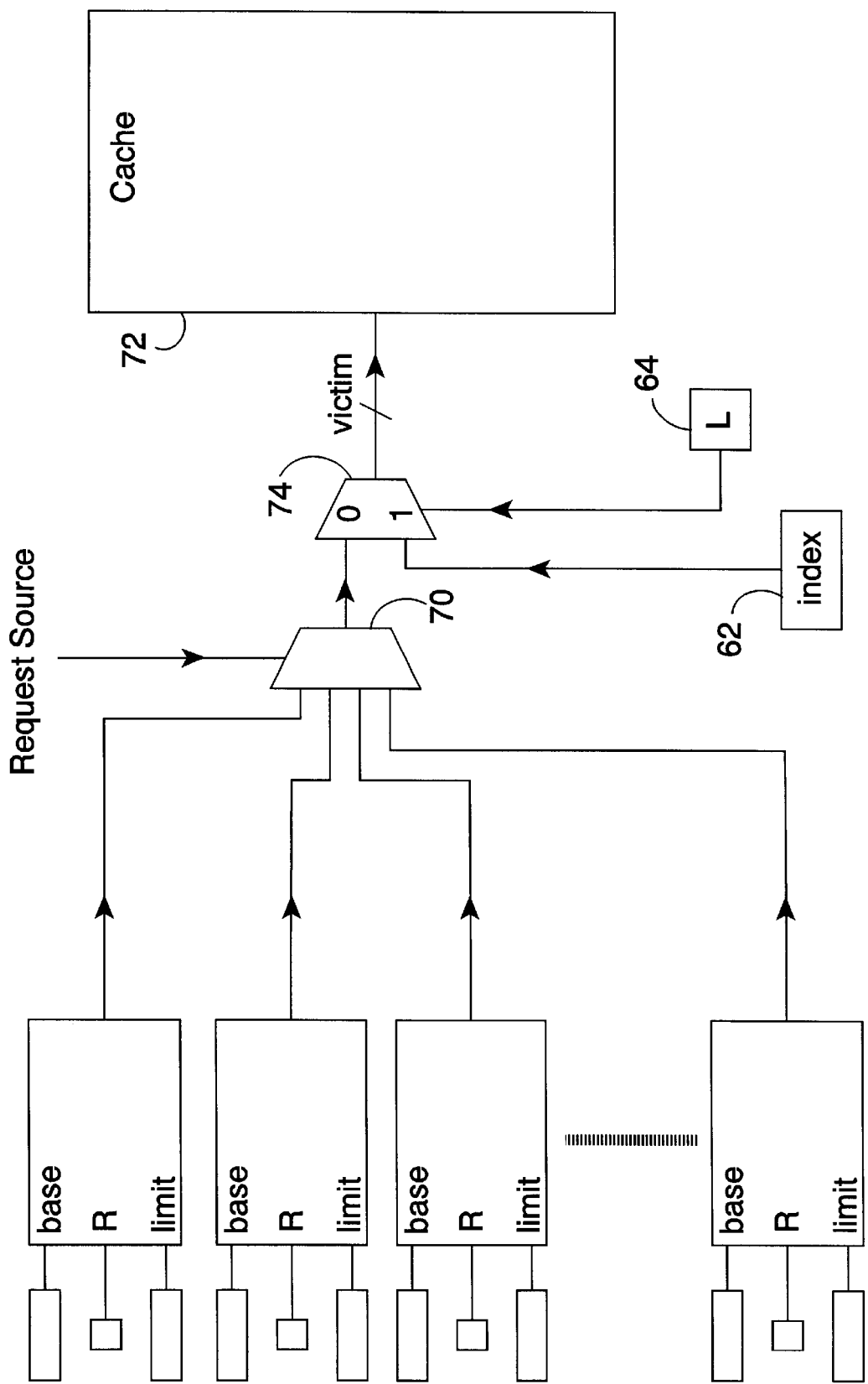
FIG. 12 illustrates a cache memory circuit split into a plurality of portions in dependence upon the request source with each portion using selectable pseudo random or round robin replacement.

FIG. 12 illustrates an extension of the system of FIG. 11. In this case, a plurality of circuits as illustrated in FIGS. 10 and 11 are provided and serve to generate pseudo random numbers within individually specified ranges or a round robin replacement when this is selected by the replacement algorithm flag. Depending upon which request source has generated the cache miss, a multiplexer 70 is switched to use one of these storage control circuits as the source of the victim number that is supplied to a cache memory 72 via a lockdown multiplexer 74. In the same way as for FIG. 11, the lockdown regions within the cache memory 72 may be specifically addressed using an index register 62 operating in conjunction with a lockdown flag register 64.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for data processing comprising:
   a cache memory having X cache storage locations each storing a data line including one or more data words;
   a storage control circuit for controlling storage of a new line within said cache memory following a cache miss including selection of a cache storage location to be overwritten when said new line is stored in said cache memory;
   wherein said storage control circuit includes a pseudo random number generator comprising a counter triggered to change a stored value by counting through one or more values in response to a pseudo random bit stream output from a pseudo random bit stream generator and said storage control circuit pseudo randomly selects said cache storage location using said stored value from a programmable range of cache storage locations A to B within said X cache storage locations of said cache memory, cache storage locations outside of said programmable range being unavailable to be overwritten, A and B being stored within respective end point registers and used as wrap values for said counter.

2. Apparatus as claimed in claim 1, wherein said storage control circuit is responsive to a programmable replacement algorithm flag to select said cache storage location with an alternative algorithm.

3. Apparatus as claimed in claim 2, wherein said alternative algorithm is sequential selection of adjacent storage locations.

4. Apparatus as claimed in claim 3, wherein when said sequential selection reaches an end of said programmable range of cache storage locations, said sequential selection wraps to another end of said programmable range.

5. Apparatus as claimed in claim 1, wherein one of A and B is a fixed value.

6. Apparatus as claimed in claim 1, wherein said pseudo random bit stream generator is a linear feedback shift register.

7. Apparatus as claimed in claim 1, wherein said pseudo random number generator is continuously operated and said stored value is used to select said cache storage location to be overwritten when needed by said storage control circuit.

8. Apparatus as claimed in claim 1, wherein said counter value is changed by one step in its counting sequence independently of said pseudo random number generator each time a cache storage location is overwritten.

9. Apparatus as claimed in claim 3, wherein said counter value is changed by one step in its counting sequence independently of said pseudo random number generator each time a cache storage location is overwritten and said pseudo random bit stream output is gated by said programmable replacement algorithm flag such that said pseudo random bit stream does not trigger said counter to change when said programmable replacement algorithm flag is set to select sequential selection.

10. Apparatus as claimed in claim 1, wherein said storage control circuit is operable in a lockdown write mode in which cache storage locations can be selected for loading under program control including cache storage locations outside of said programmable range.

11. Apparatus as claimed in claim 10, wherein a cache storage location is addressed for overwriting by a programmable lockdown address location register, and said storage control circuit includes a lockdown write mode flag which is stored in a lockdown mode register which can be modified under program control, and said storage control circuit selects said cache storage location to be overwritten using either said stored value in said counter or a value stored in said programmable lockdown address location register in dependence upon said lockdown write mode flag.

12. Apparatus as claimed in claim 11, wherein one of said end point registers is reused to serve as said programmable lockdown address location register.

13. Apparatus as claimed in claim 1, wherein
   said storage control circuit is responsive to a programmable replacement algorithm flag to select said cache storage location with an alternative algorithm;
   said alternative algorithm is sequential selection of adjacent storage locations;
   when said sequential selection reaches an end of said programmable range of cache storage locations, said sequential selection wraps to another end of said programmable range;
   one of A and B is a fixed value;
   said pseudo random number generator is continuously operated and said stored value is used to select said cache storage location to be overwritten when needed by said storage control circuit;
   said counter value is changed by one step in its counting sequence independently of said pseudo random number generator each time a cache storage location is overwritten;

said storage control circuit is operable in a lockdown write mode in which cache storage locations can be selected for loading under program control including cache storage locations outside of said programmable range;

a cache storage location is addressed for overwriting by a programmable lockdown address location register, and said storage control circuit includes a lockdown write mode flag which is stored in a lockdown mode register which can be modified under program control, and said storage control circuit selects said cache storage location to be overwritten using either said stored value in said counter or a value stored in said programmable lockdown address location register in dependence upon said lockdown write mode flag; and one of said end point registers is reused to serve as said programmable lockdown address location register.

14. Apparatus as claimed in claim 1, wherein said cache miss results from a cache request to a new word from one of a plurality of request sources and said storage control circuit is responsive to a programmable partition setting to divide said cache memory into a plurality of portions each with a storage capacity controlled by said programmable partition setting and said storage control circuit selects in which of said plurality of portions to store said new word in dependence upon which of said plurality of request sources requested said new word.

15. Apparatus as claimed in claim 14, wherein said cache request searches all of said portions for said new word to determine if a cache miss has occurred.

16. Apparatus as claimed in claim 14, wherein said cache memory is an N-way associative cache memory, where N is an integer value greater than 1, and each of said plurality of portions has a storage capacity selectable in steps of 1/N of the total cache memory storage capacity.

17. Apparatus as claimed in claim 14, comprising a central processing unit having a data request source for requesting new data words and an instruction request source for requesting new instruction words.

18. Apparatus as claimed in claim 17, wherein said cache memory has a data word portion and an instruction word portion, said programmable partition setting controlling division of capacity of said cache memory between data words and instruction words.

19. Apparatus as claimed in claim 14, wherein said storage control circuit selects which currently stored word within said selected portion of said cache memory to overwrite with said new word using independent algorithms for each of said plurality of portions.

20. A method of processing data, said method comprising the steps of:

storing data lines comprising one or more data words in a cache memory having X cache line storage locations; and controlling, with a storage control circuit, storage of a new line within said cache memory following a cache miss including selection of a cache storage location to be overwritten when said new line is stored in said cache memory;

wherein said storage control circuit includes a pseudo random number generator comprising a counter triggered to change a stored value by counting through one or more values in response to pseudo random bit stream output from a pseudo random bit stream generator and said storage control circuit pseudo randomly selects said cache storage location using said stored value from a programmable range of cache storage locations A to B within said X cache line storage locations of said cache memory, cache storage locations outside of said programmable range being unavailable to be overwritten, A and B being stored within respective end point registers and used as wrap values for said counter.

21. A method as claimed in claim 20, wherein said pseudo random bit stream is generated using a linear feedback shift register.

* * * * *